US010675967B2

(12) United States Patent
Arras et al.

(10) Patent No.: US 10,675,967 B2
(45) Date of Patent: Jun. 9, 2020

(54) TANK SYSTEM FOR A MOTOR VEHICLE HAVING A VOLUME MODIFYING ELEMENT

(71) Applicant: Bayerische Motoren Werke Aktiengesellschaft, Munich (DE)

(72) Inventors: Emmanuel Arras, Munich (DE); Jutta Pribil, Kobenhavn SV (DK); Markus Huber, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 458 days.

(21) Appl. No.: 15/372,470

(22) Filed: Dec. 8, 2016

(65) Prior Publication Data
US 2017/0087980 A1    Mar. 30, 2017

Related U.S. Application Data

(63) Continuation of application No. PCT/EP2015/065891, filed on Jul. 10, 2015.

(30) Foreign Application Priority Data

Jul. 21, 2014  (DE) .................. 10 2014 214 168

(51) Int. Cl.
*B60K 15/03* (2006.01)
*B60K 15/077* (2006.01)
(Continued)

(52) U.S. Cl.
CPC .. *B60K 15/03006* (2013.01); *B60K 15/03504* (2013.01); *B60K 15/077* (2013.01);
(Continued)

(58) Field of Classification Search
CPC ............ B60K 15/03006; B60K 15/077; B60K 15/03504; B60K 2015/03361;
(Continued)

(56) References Cited

U.S. PATENT DOCUMENTS 3,352,294 A * 11/1967 Skarstrom ........ B60K 15/03504
123/519
4,279,233 A * 7/1981 Tobita ................ F02M 25/0854
123/519
(Continued)

FOREIGN PATENT DOCUMENTS

DE    39 01 978 A1    9/1990
DE    39 10 841 A1    11/1990
(Continued)

OTHER PUBLICATIONS

European Office Action issued in counterpart European Application No. 15 738 053.6 dated Jul. 27, 2018 (11 pages).

(Continued)

*Primary Examiner* — Matthew W Jellett
(74) *Attorney, Agent, or Firm* — Crowell & Moring LLP

(57) ABSTRACT

A tank system of a motor vehicle includes a volume modifying element, having a compensation volume, which is provided in the inner chamber of the fuel tank and which is used to equalize the vapor pressure. The compensation volume is connected to the surrounding area. The only connection between the volume modifying element and the surrounding area is formed by a storage unit of the gaseous fuel components and the inner chamber of the fuel tank is connected to the surrounding area by a valve unit. The valve unit is normally open when filling the fuel tank and when exceeding or falling below the pressure limits in the inner chamber of the tank, and is otherwise closed. The storage unit is connected to the valve unit. The volume modifying element and the valve unit are designed in such a way that vehicles which are parked for several days do not undergo diurnal losses due to changes in temperature of the surroundings, due to the fact that the vapor pressure equilibrium in the fuel tank can be maintained by the automatic supply and (Continued)

removal of ambient air in the, or from the, volume modifying element as long as the valve unit remains closed.

12 Claims, 3 Drawing Sheets

(51) Int. Cl.
*B60K 15/035* (2006.01)
*F02M 25/08* (2006.01)

(52) U.S. Cl.
CPC ...... *F02M 25/089* (2013.01); *F02M 25/0836* (2013.01); *B60K 2015/0319* (2013.01); *B60K 2015/03026* (2013.01); *B60K 2015/0344* (2013.01); *B60K 2015/03085* (2013.01); *B60K 2015/03217* (2013.01); *B60K 2015/03236* (2013.01); *B60K 2015/03361* (2013.01); *B60K 2015/03514* (2013.01); *B60K 2015/0775* (2013.01)

(58) Field of Classification Search
CPC .......... B60K 2015/03026; B60K 2015/03217; B60K 2015/03236; B60K 2015/0344; B60K 2015/0319; B60K 2015/03514; B60K 2015/03085; B60K 2015/0775; F02M 25/0836; F02M 25/0854; F02M 25/089
USPC .............................. 137/588; 123/519; 141/95
See application file for complete search history.

(56) References Cited

U.S. PATENT DOCUMENTS

| | | | |
|---|---|---|---|
| 4,872,439 A * | 10/1989 | Sonoda | B60K 15/03504 123/519 |
| 5,056,493 A * | 10/1991 | Holzer | B60K 15/00 123/516 |
| 5,460,135 A | 10/1995 | Ohashi et al. | |
| 5,925,817 A | 7/1999 | Kidokoro et al. | |
| 6,240,908 B1 | 6/2001 | Hyodo et al. | |
| 6,533,002 B1 | 3/2003 | Kobayashi et al. | |
| 6,681,789 B1 * | 1/2004 | Moulis | B60K 15/03504 137/14 |
| 7,762,241 B2 * | 7/2010 | Childress | F02M 25/089 123/519 |
| 8,763,855 B1 * | 7/2014 | Harvey | B67D 7/0277 222/1 |
| 2006/0071467 A1 | 4/2006 | Miyauchi et al. | |
| 2007/0289580 A1 | 12/2007 | Potier et al. | |
| 2008/0041226 A1 | 2/2008 | Hiltzik et al. | |

FOREIGN PATENT DOCUMENTS

| | | |
|---|---|---|
| DE | 39 32 062 C2 | 1/2002 |
| DE | 10 2008 046 586 A1 | 3/2010 |
| EP | 1 028 017 A2 | 8/2000 |

OTHER PUBLICATIONS

German-language Search Report issued in counterpart German Application No. 10 2014 214 168.0 dated Mar. 6, 2015 with partial English translation (15 pages).

International Search Report (PCT/ISA/210) issued in PCT Application No. PCT/EP2015/065891 dated Dec. 14, 2015 with English translation (9 pages).

German-language Written Opinion (PCT/ISA/237) issued in PCT Application No. PCT/EP2015/065891 dated Dec. 14, 2015 (12 pages).

Schenk et al., "Inflatable Cylinders for Deployable Space Structures", Proceedings of the First Conference, Transformables 2013, Sep. 2013 (6 pages).

Schenk et al., "Review of Inflatable Booms for Deployable Space Structures: Packing and Rigidization", Journal of Spactecraft and Rockets, 2014 (47 pages).

* cited by examiner

TANK SYSTEM FOR A MOTOR VEHICLE HAVING A VOLUME MODIFYING ELEMENT

CROSS REFERENCE TO RELATED APPLICATIONS

This application is a continuation of PCT International Application No. PCT/EP2015/065891, filed Jul. 10, 2015, which claims priority under 35 U.S.C. § 119 from German Patent Application No. 10 2014 214 168.0, filed Jul. 21, 2014, the entire disclosures of which are herein expressly incorporated by reference.

BACKGROUND AND SUMMARY OF THE INVENTION

The invention relates to a tank system for a motor vehicle comprising a volume modifying element, which is provided in the inner chamber of the fuel tank and which is used to equalize the vapor pressure. The so-called "compensation volume" of said volume modifying element is connected to the surrounding area. With respect to the prior art, in addition to DE 10 2008 046 586 A1, reference is made in particular to U.S. Pat. No. 5,460,135. Instead of the term "volume modifying element", the term "volume modifying expansion means" or—at least to the extent that it relates to the present invention—the term "vapor pressure equalizing device" can be used as well.

Nowadays, the legal requirements imposed for zero-emission motor vehicle tank systems are extremely high. Under nearly any conceivable circumstances, taking into account the various country-specific regulations (the various countries worldwide issue different regulations), practically no gaseous fuel components (generally, these are hydrocarbons) are supposed to escape from the inner chamber of the tank into the surrounding area. It is known that such gaseous fuel components accumulate in particular in large quantities when filling the fuel tank with new fuel, but also after a prolonged standstill of the motor vehicle as a result of an increase in temperature. In connection with the latter, one skilled in the art is familiar with the term of "diurnal losses", which is to say, the loss(es) of gaseous hydrocarbon emissions that have to be removed from the inner chamber of the tank after a prolonged standstill of the motor vehicle due to temperature fluctuations (for example, resulting from the change from day to night) to avoid creating an impermissibly high overpressure inside the tank. However, hydrocarbon emissions that form in the tank due to temperature changes in the operation of the motor vehicle also have to be removed, wherein maintaining the respective vapor pressure equilibrium in the tank always leads to such emissions.

It is known that at least those emissions that do not accumulate when the fuel tank is being filled are temporarily stored in an activated carbon filter or the like, which in the present case is generally referred to as a storage unit for gaseous fuel components, until a combustion engine supplied with fuel from the fuel tank (and generally provided as vehicle drive aggregate) is suitably operated so that said storage unit can then be flushed. The fuel components stored temporarily therein are led to the combustion engine for combustion. For the sake of completeness, it should also be mentioned that depending on the country, it is either common practice to suction off the hydrocarbon emissions that accumulate during the refueling of the tank either during the refueling at the service station (as, for example, in the European Union="ECE system"), or to store them also in an activated carbon filter, which then has to have appropriately large dimensions, or in an appropriate storage unit (such as required in the USA as ORVR=Onboard Refueling Vapor Recovery, for example).

In view of avoiding the aforementioned "diurnal losses" or other operations-related hydrocarbon emissions, pressure tanks have already been proposed, or are in serial production, in which a correspondingly high overpressure (as well as a small negative pressure) can prevail so that, aside from extreme exceptional cases, no fuel vapors have to be removed from the tank. However, such pressure tanks are quite complex.

Furthermore, measures are known to reduce the formation of gaseous fuel components in the inner chamber of the tank, in particular in connection with a refilling process of the fuel tank; see the aforementioned U.S. Pat. No. 5,460,135. This is because it applies for the United States that all gaseous hydrocarbon emissions accumulated during the filling of the fuel tank of a vehicle must be temporarily stored in a storage unit for gaseous fuel components in the vehicle. To reduce the quantity of said emissions, the aforementioned reference provides for a flexible air bag in the fuel tank, which has its minimum volume when the tank is completely filled with fuel and, as liquid fuel is removed from the tank, is continuously filled with ambient air, whereas an emptying of said air bag is prevented. In this way, by nature, only a smaller quantity of fuel vapors can form above the liquid level in the tank, as would otherwise be the case in the same tank without such an air bag. In connection with a new refilling of the tank, the air bag is then emptied through the storage container or activated carbon filter into the surroundings.

DE 10 2008 046 586 A1 (also mentioned above) also describes a flexible air bag or the like in an inner chamber of a tank, the outer skin of which is in fluid connection with the fuel in the inner chamber of the tank (which is to say, it protrudes into it). The inner chamber of the air bag is in connection with the atmosphere, which is to say the ambient air. The air bag, which is described as expansion means in the reference, can be designed in such a fashion that with the volume changes of the fluid in the tank, which are possible in the entire operating temperature range of the tank designed as a closed system, no or nearly no increase in the fluid level (=level of liquid) occurs in the tank, which is to say, that the entire or almost the entire volume change of the fluid in the tank is compensated by the expansion means. This is to reliably prevent the escape of harmful gases into the atmosphere and facilitate an expansion of the fuel occurring during an increase in temperature.

The present invention then builds on the finding that because of the vapor pressure equilibrium in a fuel tank that is filled almost completely with liquid fuel, less gaseous fuel components are created above the liquid level than in the same fuel tank if said fuel tank is filled only half, for example, or even less. Consequently, with a flexible air bag or the like, which is provided above the liquid level created by liquid fuel in the inner chamber of the tank, the quantity of fuel components that transition from the inner chamber of the tank into the gaseous state can be reduced. Furthermore, instead of talking about an "air bag", this is then generally referred to as a volume modifying element that has or includes a modifiable compensation volume that is connected to or can be connected to the surroundings. In this way, the volume modifying element can practically breathe and react to changed boundary conditions.

There is therefore needed a tank system of a motor vehicle having a volume modifying element provided in the inner chamber of the fuel tank, the so-called compensation volume of which is in connection with the surroundings depending on certain boundary conditions, with which the current statutory regulations of important countries worldwide, in particular also the United States of America, can be further improved upon with respect to evaporations emissions with vehicle tanks with a justifiable or reduced effort, or maintained with less effort.

This need is met by a tank system of a motor vehicle with a volume modifying element provided in the inner chamber of the fuel tank, the so-called compensation volume of which is connected to the surroundings depending on various boundary conditions, having a combination of the following characteristics.

The only connection between the compensation volume of the volume modifying element and the surroundings is guided through a storage unit for gaseous fuel components, and the inner chamber of the fuel tank is connected to the surroundings via a selectable valve unit, which is generally open when the fuel tank is being filled as well as when an overpressure limit value (between the pressure in the inner chamber of the tank and the surrounding pressure) is exceeded in a magnitude of 5 mbar to 100 mbar, and when it falls below a specific negative pressure limit value (between the pressure in the inner chamber of the tank and the surrounding pressure), the amount of which is not larger than the overpressure limit value, and is otherwise closed, as well as a storage unit for gaseous fuel components connecting to said valve unit.

According to the invention, a volume-variable expansion elements or the like, which is connected to the surroundings (or the atmosphere)—referred to here as a volume modifying element—is provided in the inner chamber of the tank, and, for example, principally known from the aforementioned prior art by the term "flexible air bag" or "expansion means". According to the invention, the so-called compensation volume of the volume modifying element, which is to say the capacity of the volume modifying element, is connected to the surroundings or atmosphere exclusively via a storage unit for gaseous fuel components. As a result, ambient air, which, because of a pressure in the inner chamber of the tank that is at least slightly below the air pressure in the surroundings of the vehicle equipped with the tank system according to the invention, flows from the surroundings into the volume modifying element and always has to pass through the respective storage unit before it reaches the compensation volume. Likewise, air that is removed from the compensation volume of the volume modifying element into the surroundings because of a pressure in the inner chamber of the tank, which is higher than the entire overpressure limit value above the air pressure in the surroundings of the vehicle equipped with the tank system according to the invention, must and can always pass through said storage unit until it reaches the surroundings. This ensures (with respect to the outflow of air from the volume modifying element into the surroundings) that gaseous fuel components that reach or diffuse from the inner chamber of the tank, through the somewhat flexible wall of the volume modifying element for the representation of the volume modification, into said compensation volume are not removed into the surroundings because gaseous fuel components from the compensation volume are held back in the storage unit when the air containing such gaseous fuel components passes the storage unit. On the other hand, when air flows from the surroundings into the volume modifying element through the storage unit, the storage unit is slightly flushed so that the air introduced into the volume modifying element already contains gaseous fuel components. This can reduce—albeit slightly, but nevertheless—the tendency that through its wall additional gaseous fuel components diffuse from the tank into the inner chamber of the volume modifying element. Furthermore, an inflow of air from the surroundings into the volume modifying element is also required to compensate for the increase of the volume above said liquid level, which occurs when liquid fuel is removed from the tank, so that the air introduced to compensate the volume of removed fuel later also only has to be removed in a lesser portion.

If applicable, the volume modifying element or its compensation volume can practically act as an additional storage unit for gaseous fuel components, e.g. in that air flowing from the surroundings through the actual storage unit for gaseous fuel components into the volume modifying element carries along a part of the gaseous fuel components stored in the storage unit, which are then stored in the compensation volume of the volume modifying element. Although such gaseous fuel components have to be stored in the interim again in said storage unit when part of the air possibly flows from the volume modifying element back into the surroundings at a later time, this is made possible by the system and advantageously the storage unit, which is to say its usual activated carbon exhaust or generally its sorption means, are held closer in the range of its equilibrium and can therefore be better regenerated when fresh ambient air flows through it. In particular, however, the volume modifying element according to the invention allows a fluctuation of the partial pressure in the tank above the tank liquid level within certain limits, with the overall pressure in the fuel tank essentially remaining unchanged.

The aforementioned possible exchange of air between the compensation volume of the volume modifying element and the surroundings is or can occur in a vehicle that has been at a standstill for an extended period of time (such as longer than 24 hours, for example). This is, in particular, because of the ensuing temperature changes in the tank, which, as is known, is replicated in various statutory emissions tests (such as for the temperature range of 18° C. to 42° C.). As regards the facultative interim storage of gaseous fuel components in the volume modifying element, as mentioned above, and the partial flushing of the aforementioned storage unit connected thereto, it should be mentioned, in order to avoid misunderstandings, that the actual regeneration of said storage unit, which is to say, a practically final flushing of the same, occurs only after air from the surroundings is supplied through said storage unit to the aforementioned combustion engine or the like, for which the tank system according to the invention is provided to supply fuel, for combustion.

Furthermore, according to the invention, the tank system is developed as a practically closed negative pressure storage system, which is to say, the fuel tank and the tank system are designed such that there can be a slight pressure difference in a magnitude of up to ±100 mbar (millibar) between the pressure in the inner chamber of the fuel tank (and thus outside the volume modifying element) and the surroundings. In other words, in the inner chamber of the tank there can be up to (in the magnitude of) 100 mbar overpressure or negative pressure; however, a limit value in a smaller amount may also be provided for negative pressure. It goes without saying that depending on the design and, in particular, depending on the maximum possible size of the compensation volume of the volume modifying element in relation to the volume of the fuel tank and/or of the (also with respect to the materials being used) selected development of the volume modifying element, a lesser overpressure limit value than 100 mbar may be specified, for example also a relatively low overpressure limit value of 10 mbar. So as to ensure that these limit values for overpressure and negative pressure are maintained, a valve unit suitable for this purpose is provided in a so-called tank ventilation line, through which the inner chamber of the tank is finally connected to the surroundings and in which, of course (as is principally known) a storage unit for gaseous fuel components is provided.

The aforementioned valve unit can ensure, for example, that there is a desired connection between the inner chamber of the tank and the surroundings when the fuel tank is filled with fresh fuel. That is because the latter is needed when the tank is filled (=refueling) to either remove fuel vapors from the tank via an activated carbon filter or to suction small amounts of ambient air through the connection if the suctioning off of the fuel vapors from the tank by the gas station occurs via the gas filling pipe and the gas suction nozzle inserted therein. The valve unit can open, for example, even if one of the referenced pressure differential limit values are exceeded when the temperature in the fuel tank rises to higher values during operation of the vehicle than would normally be the case with a parked motor vehicle, or as is reproduced in the aforementioned statutory emissions tests.

It was found that with a volume modifying element according to the invention, it is possible to pass the current statutory emissions tests for motor vehicle tank systems while adhering to the aforementioned pressure differential limit values (in the magnitude of up to approx. ±100 mbar) in the inner chamber of the tank without any problems. With the exception of refueling, which is to say filling the fuel tank, the valve unit practically does not have to open in the tank ventilation line when performing the diurnal emissions tests when the vehicle is parked (which is to say, not operated), which is to say usually (except for very few exceptions) if the maximum possible capacity of the compensation volume of the volume modifying element is in a magnitude of preferably 25% to 40% of the inner chamber of the tank. It is not necessary that the volume modifying element rests with one of its walls fully on the liquid surface of the liquid fuel in the tank; rather, the volume modifying element can be, for example, as shown in the DE 10 2008 046 586 A1 mentioned earlier, developed as an air bag that extends only over a small partial area of the inner chamber of the tank, wherein it is also specifically not necessary that—as described in the aforementioned reference—the wall of the volume modifying element is in fluid connection with the fuel in the tank.

It has already been mentioned that the volume modifying element of a tank system according to the invention can be developed in the form of an elastic or in another way deformable bubble or such a bag (for example, present in folded form in a state of reduced capacity), But it can definitely also be designed differently. What is essential is that the volume modifying element has a suitably deformable wall, with the help of which the capacity or the compensation volume of the volume modifying element can be modified in a broad scope, which is to say from nearly zero up to (as already facultatively stated) preferably 25% to 40% of the inner chamber of the tank. In doing so, it is always possible, even in case of an elastic bubble or an elastically deformable bag, that a deformable wall of the volume modifying element completely encases the compensation volume. Alternatively, however, the aforementioned modifiable compensation volume, which is connected to the surroundings, can also be formed by a suitable deformable wall element of the volume modifying element in cooperation with a section of the inner wall of the fuel tank.

According to an advantageous refinement, a protective splatter wall may be provided in the fuel tank. This wall encloses the volume modifying element in its greatest possible expansion at least in sections and has through-openings for fuel. To limit the mechanical load on the deformable volume modifying element caused by sloshing movements of the fuel in the fuel tank during driving of the motor vehicle, walls (or at least one such wall) provided with holes or the like are proposed, which practically form a protective box around the expanded volume modifying element. The holes in the wall or in the slosh protection walls are developed such that when filling the fuel tank, which is to say when refueling, the difference between the liquid level inside and outside of the "protective box" is no more than two centimeters in height. This partially permeable slosh-protective wall thus forms a flow resistance for sloshing movements of the fuel in the tank and reduces the pressure load on the volume modifying element resulting therefrom.

In particular at a high filling level, which is to say, a high liquid level in the fuel tank, the volume modifying element may, if applicable, partially dip into the fuel. Thus, if the fuel level is measured according to the principle of a lever sensor, which has been widely used to date, the electronic evaluation unit of such a filling level measuring device should also in addition take into account, if applicable, a negative pressure in the fuel tank (by means of a pressure sensor) to prevent measuring errors due to the aforementioned immersion. This makes it possible to draw, by calculation, conclusions as to the immersion depth of the volume modifying element in the liquid level, for example, even in the case of an unfolding bag (as volume modifying element), if the folding behavior of said bag is known. Taking negative pressure in the tank into account in the evaluation of a lever sensor signal, as is proposed here, is also possible using an experimentally (for various liquid levels) determined characteristic diagram, or there is the option that in case of negative pressure in the tank, the current measuring signal of the lever sensor is not taken into account at all, but rather recent measuring values that are corrected with current fuel usage values, if applicable, are relied upon.

A volume modifying element that works according to the invention should be permeation-proof, if possible, and capable of performing many thousands of volume enlargement processes and volume reduction processes. To that end, the volume modifying element can be developed in form of a foldable bubble or a purposely foldable bag, which is to say, it should be designed to unfold automatically, for example like an Origami technique, for a volume enlargement, and fold up automatically for a volume reduction. This also allows the use of a sufficiently dense material (also dense with respect to permeation). Here, reference is made to such foldable structures, for example Origami-like structures or containers, for example, described in the article "Inflatable Cylinders for Deployable Space Structures" by Mark Schenk et al, which can be found in the Internet under http://www.markschenk.com/research/files/schnek2013-Transformables.pdf, or also to the article "Review of Inflatable Booms for Deployable Space Structures: Packing and Rigidization" under http://www-g.eng.cam.ac.uk/advanced-structures/files/pdf/2014JSR.pdf.

The storage unit for gaseous fuel components provided in the connecting line between the compensation volume of the volume modifying element and the surroundings can be developed so as to take up essentially gaseous fuel components, which diffuse through the wall of the volume modifying element into its compensation volume (AV) and be present there in extremely low concentration in the magnitude of several thousand ppm (parts per million). However, activated carbon filters generally provided with fill are not able to absorb gaseous hydrocarbons from such small concentrations, which is why a smaller storage unit is proposed here for gaseous fuel components, which is described as "low bleed emission activated carbon filter" or "honeycomb" and is known in this form in particular from open vehicle tank systems intended for the United States.

However, alternatively, the aforementioned storage unit can also be designed to take up, additionally or primarily, such gaseous fuel components as are removed in the operation of the motor vehicle because of too high temperatures in the tank, or in the filling of the fuel tank with fresh fuel via the aforementioned, then open valve unit from the fuel tank. In that case—as already mentioned earlier—the compensation volume of the volume modifying element can function as additional storage for gaseous fuel components, namely in that air flowing from the surroundings through the actual storage unit for gaseous fuel components into the volume modifying element carries along a portion of the gaseous fuel components stored in the storage unit, which are then stored in the compensation volume of the volume modifying element.

According to another alternative, the tank system according to the invention can, in its entirety, comprise two storage units for gaseous fuel components, namely a first larger storage unit which, viewed from the inner chamber of the tank, connects to the aforementioned valve unit (also referred to as negative pressure tank locking valve), which acts as an activated carbon filter for the refueling and/or for high tank pressure values in the operation of the motor vehicle, as well as a second smaller storage unit such as the aforementioned "low bleed emissions activated carbon filter" or "honeycomb", which in the tank ventilation line, when viewed from the inner chamber of the tank in the direction of the surroundings, connects to the first storage unit. A preferably single connecting line with the compensation volume of the volume modifying element can then either extend into a connection between the first storage unit and the second storage unit (for gaseous fuel components), or alternatively, when viewed from the volume modifying element, into the first storage unit or upstream of the same into a tank ventilation line comprising the valve unit downstream of the valve unit.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
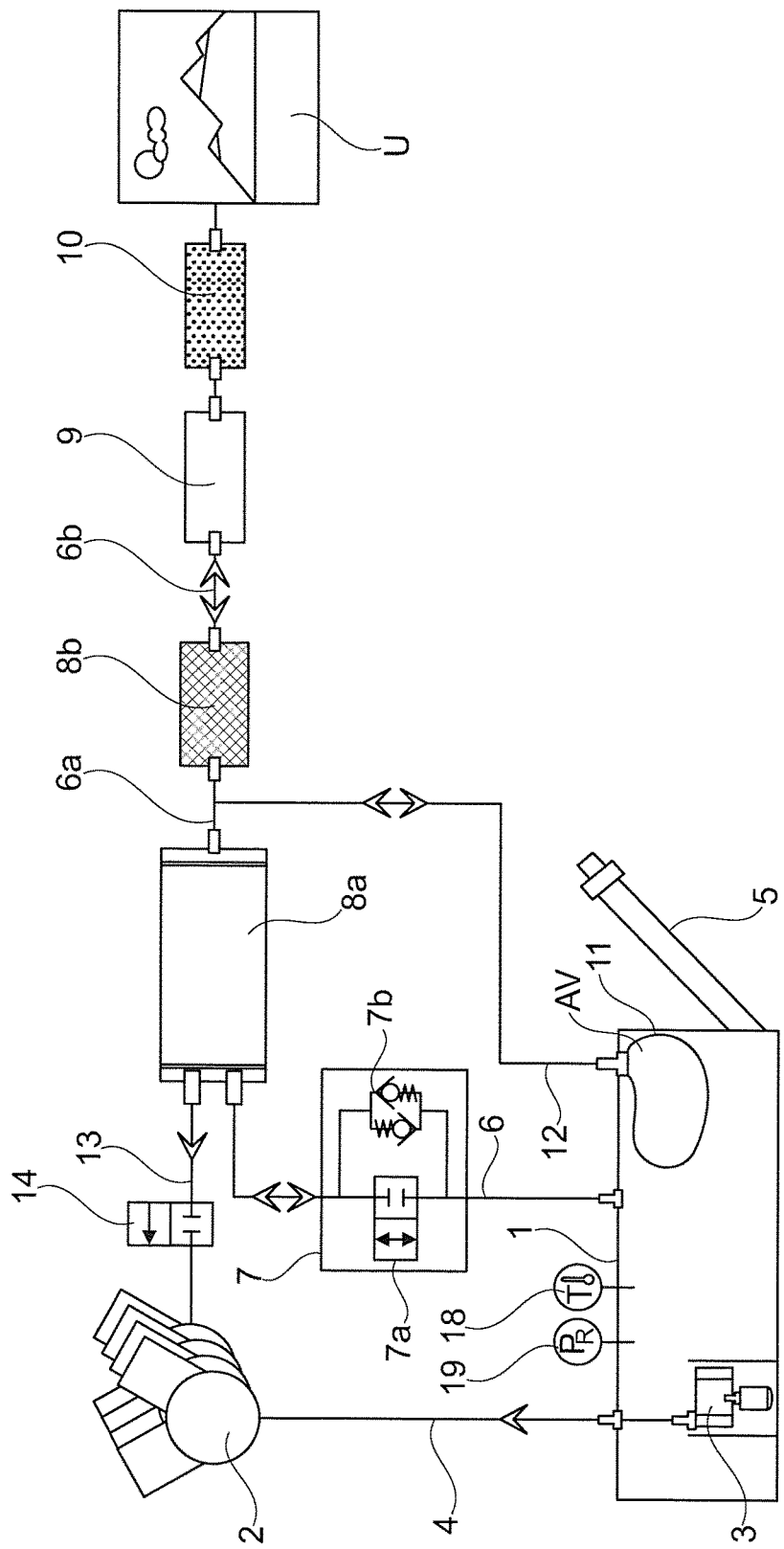
FIG. 1 is a schematic diagram illustrating a first exemplary embodiment of a tank system according to the invention.

Referring first to FIG. 1, a tank or fuel tank of a motor vehicle has the reference numeral 1 and a combustion engine supplied with fuel from the tank has the reference numeral 2. The fuel is delivered to the combustion engine by way of a fuel pump unit 3 provided in the tank 1 via a supply line 4. A filling nozzle, through which the tank 1 can be refilled with fuel, has the reference numeral 5.

A tank ventilation line 6 leads from the inner chamber of the tank 1 through a valve unit 7 to a first storage unit 8a filled with an adsorption means for gaseous fuel components, or the ventilation line 6 extends in the inner chamber of a storage unit for gaseous fuel components, which functions as a so-called activated carbon filter and has the reference numeral 8a, and gaseous fuel components are removed via the ventilation line 6 out of the inner chamber of the tank when the valve unit 7 is open. At the other end of the first storage unit 8a, the ventilation line 6 continues as line 6a and extends into a second storage unit 8b for gaseous fuel components, also called a "honeycomb" or a "low bleed emission activated carbon filter", which also contains an activated carbon, but with different storage properties. Exiting the second storage unit 8b, the tank ventilation line 6 continues as line 6b via a tank leakage diagnostic unit 9 (=NVLD=Natural Vacuum Leak Detection) and a dust filter 10 into the surroundings U.

In the inner chamber of the tank 1, a volume modifying element 11 is provided, which is here (in the exemplary embodiments according to the FIGS. 1, 2) developed as a flexible and also an elastically deformable bubble, which includes a compensation volume AV that is connected to the surroundings U via a ventilation line 12. To that end, the ventilation line 12, which runs into the compensation volume AV of the volume modifying element 11, penetrates the wall of the tank 1 and finally runs into the line 6a, which, as already explained, connects the first storage unit 8a to the second storage unit 8b. As far as the connection between the compensation volume AV of the volume modifying element 11 and the surroundings U is concerned, the connection is guided in the form of the ventilation line 12 through the storage unit 8b for gaseous fuel components in the exemplary embodiment according to FIG. 1. The function of the volume modifying embodiment 11 was explained in detail prior to the description of the figures.

Likewise, the function of the valve unit 7, which is here formed by a parallel connection of two valve elements 7a, 7b and is also called a negative pressure tank locking valve, has also already been explained in principle.

The first valve element 7a is a stop valve that can be controlled by an electronic control unit. The stop valve is usually put in its open position during refueling and when exceeding a specified limit pressure in the tank 1, and is otherwise closed. In particular so as not to exceed the limit pressure (with respect to overpressure as well as negative pressure), the first valve element 7a is suitably controlled in this way by a sensor 18 that measures the temperature T in the tank 1 in combination with a sensor 19 that measures the pressure P in the tank 1. A refueling process that is about to occur or has already occurred can be recognized, for example, via a refueling request key to be actuated by the user of the motor vehicle or by a tank flap sensor.

The second valve element 7b is here a pairing of check valves that are connected in parallel and opposite to one another, which open automatically only after a minimum pressure has been reached. The check valves or the second valve element 7b is/are designed such that they open only if the pressure values in the inner chamber of the tank 1 (aside from the volume modifying element 11), differ from the pressure in the surroundings by an amount of 100 mbar, for example. In other words, the valve element 7b of the valve unit 7 (which is connected to function in parallel with the first valve element 7a) opens either when there is an overpressure of approx. 100 mbar in the inner chamber of the tank, after which fuel vapors travel from the inner chamber of the tank into the two storage units 8a, 8b where the gaseous fuel components are held back whereas the air reaches the surroundings U, which overpressure is thus reduced, or if there is a negative pressure of approx. 100 mbar in the inner chamber of the tank, after which ambient air reaches the inner chamber of the tank via the storage units 8a, 8b, which negative pressure is thus relieved. However, in deviation to the explanation above, the check valves of the valve element 7b can also be designed for various differential pressure values and/or other absolute values such that the valve element 7b from the tank 1 to the surroundings U (or to the storage unit 8a) opens when an overpressure limit value of 70 mbar, for example, has been reached in the tank, whereas the valve element 7b from the surroundings U (or from the storage unit 8a) to the tank 1 opens only after a negative pressure limit value, the amount of which is lesser or not higher than the aforementioned overpressure limit value and may be in the magnitude of 30 mbar, for example, has been reached in the tank. (Said negative pressure limit value can be specified by the maximum admissible load of the volume modifying element 11 by overpressure in the compensation volume AV). In principle, it is pointed out that the numbers of the aforementioned pressure values do not represent a limitation of the present invention, which is to say, said pressure values can be selected as it makes sense for the respective application case. However, the magnitude of useful pressure values runs in a range from about 5 mbar to about 100 mbar.

However, if the vehicle is standing still over a practically unlimited time, or at least over a greater number of days, the valve unit 7 is not supposed to open at all on a tank system according to the invention. Rather, the compensation then occurs because of the different volume of the fuel in the inner chamber of the tank or its vapor pressure change due to different ambient temperatures (especially during day and night) solely due to the volume change of the volume modifying element 11, which for this purpose either removes air from the compensation volume AV of the volume modifying element 11 to the surroundings via the ventilation line 12 as well as the second storage unit 8b, or takes up air from the surroundings U. The process of the expansion of the volume modifying element 11 if the compensation volume AV increases or the reduction of the volume modifying element 11 if the compensation volume AV decreases due to exchanging air with the surroundings U can practically continue with proper dimensioning of the relevant components without an increasing evaporation of fuel in the tank 1 requiring an opening of the valve unit 7.

Figure 2:
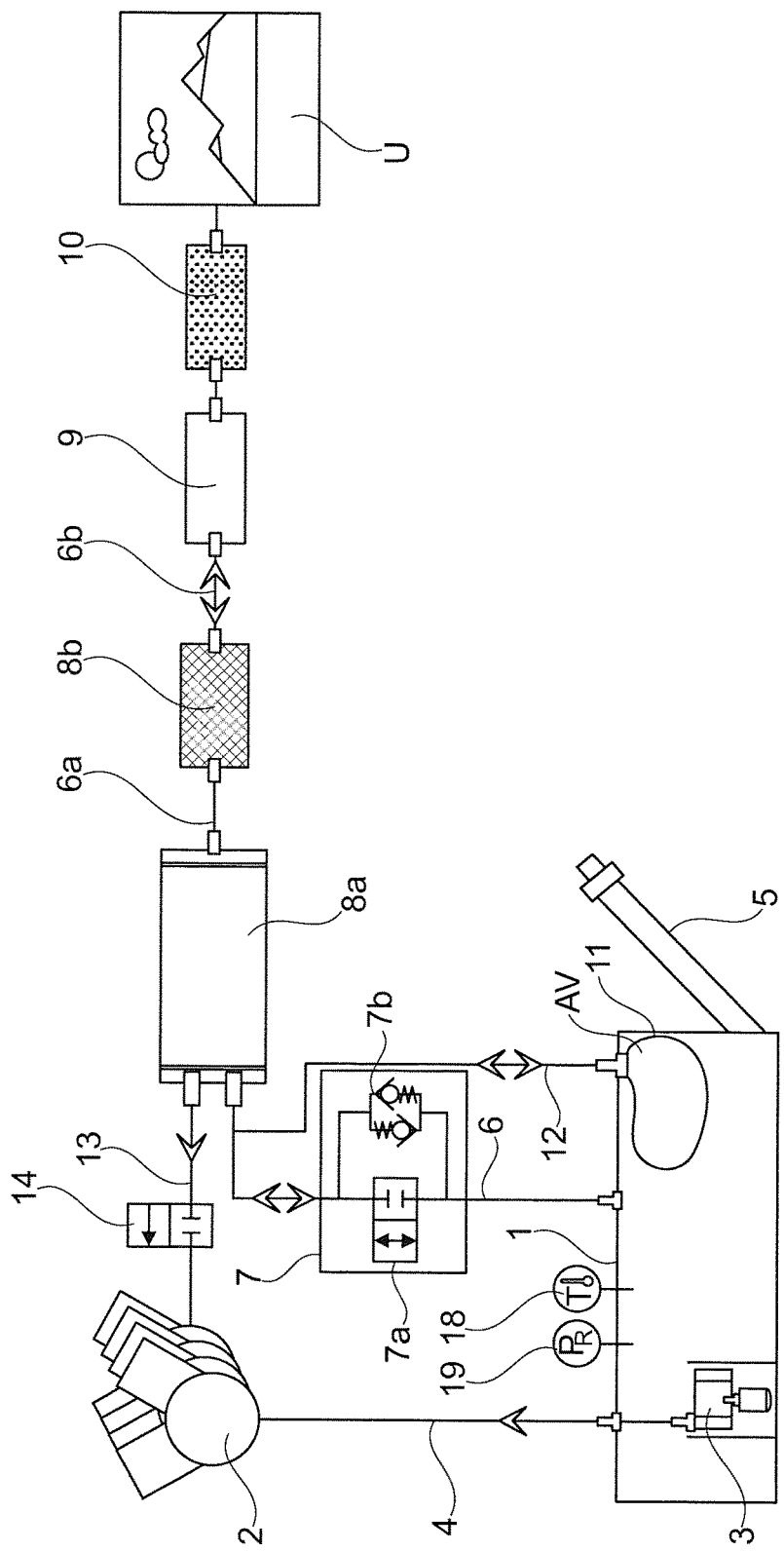
FIG. 2 is a schematic diagram illustrating an alternative embodiment of a tank system according to the invention.

FIG. 2 (using the same reference numerals as in FIG. 1 for the same components) shows another embodiment, wherein the only significant difference to FIG. 1 is that the ventilation line 12 of the volume modifying element 11 runs into the tank ventilation line 6 upstream of the storage unit 8a, which is to say, between the valve unit 7 and the storage unit 8a. This slightly flushes the two storage units (8a, 8b) and, in particular, also the storage unit 8a when fresh ambient air travels through the storage units into the compensation volume AV of the volume modifying element 11. In this way, the compensation volume AV of the volume modifying element 11 can—as explained prior to the description of the figures—practically function as an additional storage for gaseous fuel components, with the advantage that the activated carbon fill of the storage unit 8a is held closer in the range of its equilibrium, which further reduces the probability of a potential breakdown of the storage unit 8a.

A flushing or regeneration of the storage units 8a, 8b, which are carried out in the embodiment according to FIG. 1 as well as in the embodiment according to FIG. 2 in addition to taking up fuel components that diffuse through the wall of the volume modifying element 11 into its compensation volume AV, in particular during refueling, which is to say, filling the tank 1 with fresh fuel and, if applicable, when the pressure limit values in the tank 1 are exceeded, occurs as is common practice with conventional tank systems. When the combustion engine 2 is in operation, air from the surroundings U for flushing the storage units 8a, 8b travels via the line 6b into the second storage unit 8b and further via the line 6a and the first storage unit 8a through a flushing line 13, in which a flushing valve 14 is provided that is then open but otherwise closed, into the combustion chambers of the combustion engine 2, where the gaseous fuel components that were previously temporarily stored in the two storage units 8a, 8b and carried along by the flushing air, are combusted. At this point, it should again be mentioned that the pressure limit values in the tank can be practically exceeded only when the motor vehicle is operated or refueled, and that gaseous fuel components have to be stored in the storage units only when the valve element 7a or the valve element 7b of the valve unit 7 is open, which, however, does not occur during a prolonged standstill of the vehicle, or should not occur.

It should also be mentioned as an advantage of the tank system according to the invention that—in addition to attaining the object of the present invention—the use of a conventional passive tank leakage diagnostic unit 9 (as is known with open tank systems) is possible, although the present tank system is developed as a so-called quasi-closed low pressure storage system in which a small pressure difference in the magnitude of up to ±100 mbar (millibar) may be present between the pressure in the inner chamber of the fuel tank 1 (and therefore outside of the volume modifying element 11) and the surroundings U, or in any case, when seen over a longer standstill phase of the vehicle, is present.

Figure 3:
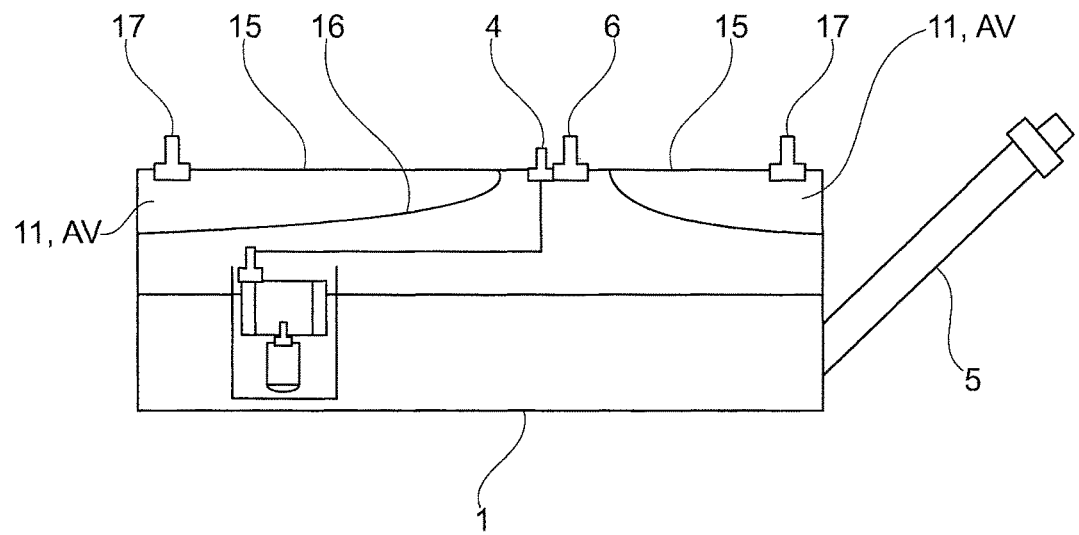
FIG. 3 is a simplified schematic diagram illustrating an alternative embodiment of a volume modifying element provided in a tank system according to the invention.

FIG. 3 shows an alternate embodiment of a volume modifying element 11 provided in the tank 1, sections of which are delimited by an inner wall section 15 of the tank 1. A flexible wall section 16 of the volume modifying element 11 is formed by a membrane 16 that is suitably attached at the edge of the inner wall section 15. In the present case, such membranes 16 are provided in two corner regions of the inner chamber of the tank so that via two air vents 17, which are connected to the ventilation line 12 in FIG. 1, volume modifying elements 11 that are connected parallel to one another are provided, each of which form a compensation volume AV.

Figure 4:
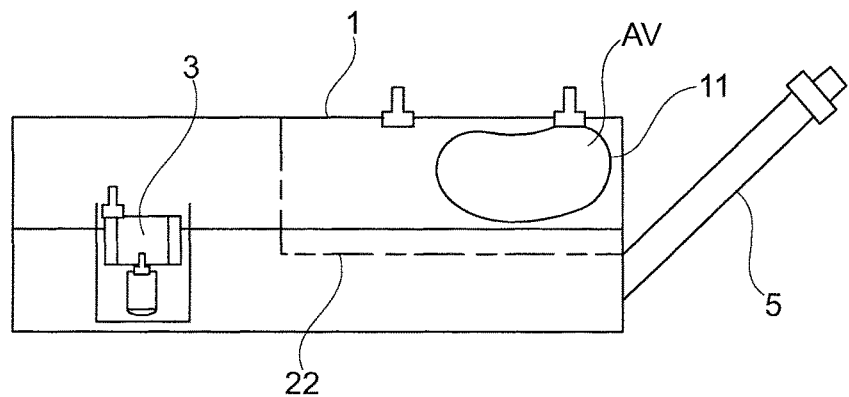
FIG. 4 is a simplified schematic diagram illustrating an exemplary slosh-protection sheet provided in a tank system according to the invention.

Finally, FIG. 4 shows a slosh protection wall 22 in a very abstract form for the volume modifying element 11, which was already explained prior to the description of the figures. Breakthroughs or holes are provided so that the fuel can reach through the breakthroughs or holes even in the chamber enclosed by the slosh protection wall 22, in which the volume modifying element 11 located there can expand to its maximum admissible size. However, the passage of fuel into the chamber occurs in a throttled fashion so that the volume modifying element 11 is affected only to a limited extent by the sloshing movements of the fuel in tank 1, which, as is known, occur when vehicles are moved.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A tank system of a motor vehicle, comprising:
a fuel tank having an inner chamber;
a volume modifying element provided in the inner chamber of the fuel tank, wherein a compensation volume of the volume modifying element is connected to surroundings of the motor vehicle depending on boundary conditions;
a valve unit connecting the inner chamber of the fuel tank with the surroundings, wherein
the valve unit is normally open when the fuel tank is being filled as well as when an overpressure limit value in a magnitude of up to 100 mbar is exceeded and when the overpressure limit value falls below a specific negative pressure limit value of an amount not above the overpressure limit value between a pressure in the inner chamber of the tank and a surrounding pressure, and the valve unit is otherwise closed;
a first storage unit for gaseous fuel components and a second storage unit for gaseous fuel components, the second storage unit being arranged downstream of the first storage unit in a direction of the surroundings;
a tank ventilation line leading from the inner chamber of the fuel tank through the valve unit to the first storage unit for gaseous fuel components, and extending from the first storage unit into the second storage unit for gaseous fuel components; and
a ventilation line for the compensation volume of the volume modifying element extending only into:
the tank ventilation line between the first and second storage unit,
(ii) the first storage unit, or
(iii) the tank ventilation line upstream of the first storage unit and downstream of the valve unit.

2. The tank system according to claim 1, wherein
the volume modifying element and the valve unit are configured such that when a motor vehicle is parked for an extended period, no diurnal losses are created due to changes in ambient temperature in that vapor pressure equilibrium is maintained by independent intake and removal of ambient air into or from the volume modifying element to an extent that the valve unit remains close.

3. The tank system according to claim 1, wherein
a maximum capacity of the compensation volume of the volume modifying element is in a magnitude of 25% to 40% of the inner chamber of the fuel tank.

4. The tank system according to claim 1, wherein
the volume modifying element is configured as a deformable bubble or bag, which either completely or in cooperation with a section of an inner wall of the fuel tank forms the compensation volume, the compensation volume being modifiable and connected to the surroundings.

5. The tank system according to claim 1, further comprising:
a slosh protection wall provided in the fuel tank, wherein
the slosh protection wall at least partially encloses the volume modifying element in a maximum state of expansion and has through-openings for fuel.

6. The tank system according to claim 1, further comprising:
a measuring device for a fuel filling level in the fuel tank, the measuring device operating as a level sensor; and
an electronic evaluation unit of the level sensor being configured to take into account a negative pressure in the fuel tank, if applicable.

7. The tank system according to claim 1, wherein
the volume modifying element is configured to unfold automatically for a volume enlargement and to fold up automatically for a volume reduction.

8. The tank system according to claim 1, wherein:
the second storage unit, as well as the first storage unit, contains an activated carbon, but with different storage properties.

9. The tank system according to claim 1, wherein the second storage unit is formed so as to be smaller than the first storage unit.

10. The tank system according to claim 9, wherein the second storage unit is a honeycomb or low bleed emission activated carbon filter.

11. The tank system according to claim 10, wherein the valve unit is a negative pressure tank lock valve.

12. The tank system according to claim 1, wherein:
the first storage unit is provided for refueling and/or for high tank pressure values when operating the motor vehicle.

* * * * *